United States Patent
Lucero et al.

(10) Patent No.: US 11,845,695 B2
(45) Date of Patent: Dec. 19, 2023

(54) ACCELERATOR FOR MINERAL BINDER COMPOSITIONS

(71) Applicant: SIKA TECHNOLOGY AG, Baar (CH)

(72) Inventors: Andrea Lucero, Rutherford, NJ (US); Mohamed Cader, Cranford, NJ (US); Iryna Zender, Hoboken, NJ (US)

(73) Assignee: SIKA TECHNOLOGY AG, Baar (CH)

( * ) Notice: Subject to any disclaimer, the term of this patent is extended or adjusted under 35 U.S.C. 154(b) by 283 days.

(21) Appl. No.: 17/277,590

(22) PCT Filed: Sep. 16, 2019

(86) PCT No.: PCT/EP2019/074743
§ 371 (c)(1),
(2) Date: Mar. 18, 2021

(87) PCT Pub. No.: WO2020/058210
PCT Pub. Date: Mar. 26, 2020

(65) Prior Publication Data
US 2021/0355032 A1 Nov. 18, 2021

(30) Foreign Application Priority Data
Sep. 18, 2018 (EP) ..................................... 18195137

(51) Int. Cl.
| | | |
|---|---|---|
| C04B 28/06 | (2006.01) | |
| C04B 14/28 | (2006.01) | |
| C04B 22/00 | (2006.01) | |
| C04B 22/14 | (2006.01) | |
| C04B 40/00 | (2006.01) | |
| C04B 40/06 | (2006.01) | |
| C04B 103/10 | (2006.01) | |
| C04B 103/32 | (2006.01) | |

(52) U.S. Cl.
CPC .............. C04B 28/06 (2013.01); C04B 14/28 (2013.01); C04B 22/0093 (2013.01); C04B 22/147 (2013.01); C04B 40/0042 (2013.01); C04B 40/0641 (2013.01); C04B 2103/10 (2013.01); C04B 2103/32 (2013.01)

(58) Field of Classification Search
CPC ..... C04B 28/06; C04B 14/28; C04B 22/0093; C04B 22/147; C04B 40/0042; C04B 40/0641; C04B 2103/10; C04B 2103/32; C04B 40/0039; C04B 28/02
See application file for complete search history.

(56) References Cited

U.S. PATENT DOCUMENTS

| | | | |
|---|---|---|---|
| 5,120,367 A | 6/1992 | Smith et al. | |
| 6,451,105 B1 | 9/2002 | Turpin, Jr. | |
| 9,915,065 B2 * | 3/2018 | Bernardi | ................. C04B 28/02 |
| 2001/0043999 A1 | 11/2001 | Scott et al. | |
| 2014/0293728 A1 | 10/2014 | Duveau et al. | |

FOREIGN PATENT DOCUMENTS

| | | |
|---|---|---|
| CN | 103930384 A | 7/2014 |
| EP | 2468696 A1 | 6/2012 |
| JP | H11-60298 A | 3/1999 |
| JP | 2001-64058 A | 3/2001 |
| WO | 03/000617 A1 | 1/2003 |
| WO | 2015/092004 A2 | 6/2015 |

OTHER PUBLICATIONS

Han et al., "Influence of sodium aluminate on cement hydration and concrete properties," Construction and Building Materials, 2014, vol. 64, pp. 347-349.
Krismahariyanto et al., "Concentration effect of sodium carbonate and sodium aluminate as accelerator and H2O mixing against physical properties: Flow ability, setting time, and strength in low cement castable refractory product (Case study: PT. Indoporlen)," AIP Conference Proceedings 1877, 2017, 090002-1-090002-14.
Oct. 21, 2019 International Search Report issued in International Patent Application No. PCT/EP2019/074743.

* cited by examiner

*Primary Examiner* — Anthony J Green
(74) *Attorney, Agent, or Firm* — Oliff PLC

(57) ABSTRACT

An additive for mineral binder composition, in particular accelerators for mineral binder compositions, in particular cementitious binder compositions. The accelerator includes 35 to 99.7 w % of at least one mineral filler F with a particle size D50<5 μm, preferably <4 μm, most preferred <3.5 μm, 0.3 to 65 w % of a sodium aluminate SA, and 0 to 45 w % of at least one other inorganic compound I selected from the group consisting of calcium aluminate cements and/or sulfates of alkali or alkaline earth metals. Further, corresponding mineral binder compositions as well as uses and processes, including the acceleration of setting and curing of mineral binder compositions at low temperatures.

16 Claims, No Drawings

ACCELERATOR FOR MINERAL BINDER COMPOSITIONS

TECHNICAL FIELD

The invention relates to additives for mineral binder compositions, in particular to accelerators for mineral binder compositions, in particular cementitious binder compositions, corresponding mineral binder compositions and moldings produced therefrom. Furthermore, the invention relates to uses and processes, including the acceleration of setting and curing of mineral binder compositions at low temperatures, and to the production of accelerators for mineral binder compositions and of corresponding mineral binder compositions.

BACKGROUND OF THE INVENTION

Mineral binder compositions, in particular cementitious binder compositions, which cure by the hydraulic reaction of mineral binders with water, are significantly retarded when mixed and/or placed at low temperatures. This can lead to a slow built-up of strength, especially compressive strength, which in turn may lead to longer waiting periods before further work or release for use can be done. In particularly unfavorable cases mineral binder compositions do not set and cure at all. Most cementitious binder compositions require temperatures above 5° C. during mixing and placing for proper development of properties. As temperatures in different climate zones can drop well below 5° C. for significant periods of time during the year measures such as tempering of raw materials, heating of job sites, or accelerating the hydraulic reaction of mineral binders, need to be taken. Especially the tempering of raw materials or the heating of job sites can be difficult, expensive or even impossible at a given job site.

Different curing accelerators for mineral binder compositions are thus known. They are for example based on alkanolamines, halides, nitrites, nitrates, thiocyanates, glycols, glycerol or α-hydroxycarboxylic acids. Although such known accelerators can be quite effective, they frequently have the disadvantage that they are expensive, have a restricted field of use, such as for example use at temperatures >15° C., are problematic with regard to environment, health and safety, have a potential for corrosion of steel reinforcements, and sometimes have a strongly negative influence on the workability, processing time and the final strengths of mineral binder compositions.

WO 2003/000617 A1 (Sika AG) describes, for example, a curing accelerator for mineral binder compositions which is based on an alkanolamine, an inorganic nitrate, a carboxylic acid and a polyol. Such accelerators can increase the risk of corrosion.

U.S. Pat. No. 6,451,105 (R. C. Turpin) discloses the use of limestone powder as an accelerator for cementitious materials containing Portland cement. However, the effect described therein is not strong enough.

In addition, many of the curing accelerators known today relate to spray concrete. Such accelerators are for example disclosed in EP3083525 (Sika Technology AG). These accelerators have the effect of making the cement or concrete mixtures set very quickly after addition of the accelerator, which is usually desirable in spray concrete applications. However, when the mineral binder compositions have to be processed further after mixing with water, such known accelerator systems are not very suitable.

Additives, including accelerators, for mineral binder compositions can also bear different risks to health and safety of humans exposed to such additives. They can, for example, be alkaline or acidic in nature and thus have detrimental effects when coming into contact with mucous membranes or the skin. If supplied in powder form such additives can additional have adverse effects on the respiratory system if dusts are inhaled. Operators working with such materials thus have to wear protective clothing and accessories. Providing such additives in suitable packaging can significantly reduce exposure of operators and thus avoid the use of additional protective gear.

There is thus a constant need for improved accelerators for mineral binder compositions that accelerate the setting and/or curing of mineral binder compositions at low temperatures without compromising workability and final strength of the mineral binder compositions and that are safe to handle by the operator.

DESCRIPTION OF THE INVENTION

It is thus an objective of the present invention to provide accelerators for mineral binder compositions, in particular cementitious binder compositions, which accelerate setting and curing of such mineral binder compositions. The accelerators for mineral binder compositions should in particular give high compressive strength at an early time after mixing and/or placing of the mineral binder compositions without compromising workability and final strength of the mineral binder compositions. It is furthermore an objective of the present invention to provide accelerators for mineral binder compositions, in particular cementitious binder compositions, which accelerate setting and curing of mineral binder compositions at temperatures between +10° C. and −15° C., preferably between +8° C. and −10° C.

In addition, it is an objective of the present invention to provide processes and uses for the acceleration of setting and curing of mineral binder compositions, preferably at temperatures between +10° C. and −15° C., preferably between +8° C. and −10° C.

It is a further object of the present invention to provide processes for the production of accelerators for mineral binder compositions and corresponding mineral binders and mineral binder compositions, in particular with respect to safe handling, metering, and dosing of said accelerators.

It has surprisingly been found that the objectives of the invention can be achieved by a composition as claimed in claim 1.

The composition of the present invention, in particular an accelerator for mineral binder compositions, accordingly comprises or consists of
1) 35-99.7 w % of at least one mineral filler F with a particle size D50<5 μm, preferably <4 μm, most preferred <3.5 μm,
2) 0.3-65 w % of a sodium aluminate SA,
3) 0-45 w % of at least one other inorganic compound I selected from the group consisting of calcium aluminate cements and/or sulfates of alkali or alkaline earth metals,
4) optionally further additives for mineral binder compositions, in particular cementitious binder compositions.

It has been found that the inventive combination of a mineral filler F, sodium aluminate SA, and optionally at least one other inorganic compound I used in a mineral binder composition leads to a significant increase in compressive strength between 3 h-8 h after mixing with water.

Further advantages of a composition according to the present invention are that they do not negatively influence other important properties of mineral binder compositions such as for example the workability, flexural strength or the final strength and due to the absence of chlorides, nitrates, nitrites and thiocyanates have a low risk of leading to corrosion of steel reinforcement.

Furthermore, the compositions of the invention display an essential constant effect independently of the point in time of addition when used as setting and/or curing accelerators. In particular, such compositions remain effective over a prolonged period of time when added to a component of the mineral binder composition, e.g. a mineral binder and/or the aggregates, before mixing of a mineral binder composition with water. This is in particular also true when the component of the mineral binder composition contains residual moisture, as is normally the case for aggregates, for example. Overall, increased flexibility in the use of the compositions of the present invention is thus achieved.

Compositions of the present invention can thus be used in a variety of applications. The compositions can, for example, be used as accelerating additives for mortar compositions, concrete compositions, cement slurry compositions and/or spray concrete compositions.

Further aspects of the invention are subject matter of further independent claims. Particularly preferred embodiments of the invention are subject matter of the dependent claims.

WAYS OF CARRYING OUT THE INVENTION

For the present purpose the term "accelerator" stands for a substance or mixture of substances that influences the hydraulic reaction of mineral binders with water so that the setting and/or curing of mineral binder compositions becomes faster. In particular, an accelerator leads to an increase in the compressive strength of the mineral binder composition after a defined point in time after mixing with water if compared to a blank without added substances. Alternatively, and for the purpose of the present invention preferred, an accelerator can lead to the same compressive strength of the mineral binder composition after a defined point in time after mixing with water if compared to a blank without added substances if mixing and/or curing of the mineral binder compositions containing an accelerator takes place at lower temperature compared to the blank.

The expression "mineral binder" refers in the context of the present invention in particular to a binder, which in the presence of water reacts in a hydration reaction to form solid hydrates or hydrate phases. This can be, for example, a hydraulic binder (e.g. cement or hydraulic lime), a latent hydraulic binder (e.g. slag), a pozzolanic binder (e.g. fly ash) or a nonhydraulic binder (gypsum plaster or white lime). A "mineral binder composition" is accordingly a composition containing at least one mineral binder. For the present purposes, a "cementitious binder" or a "cementitious binder composition" is, in particular, a hydraulic binder or a hydraulic binder composition having a proportion of at least 5% by weight, in particular at least 20% by weight, preferably at least 35% by weight, especially at least 65% by weight, of cement clinker. According to a preferred embodiment the cement clinker is Portland cement clinker. In the present context, cement clinker is, in particular, milled cement clinker.

In particular, the mineral binder or the binder composition comprises a hydraulic binder, preferably cement. Particular preference is given to a cement having a cement clinker content of 35% by weight. In particular, the cement is of the type OEM I, II, III (according to the standard EN 197-1) and/or a calcium aluminate cement (according to the standard EN 14647:2006-01). Preferably, the cement is of the type OEM I. A proportion of the hydraulic binder in the total mineral binder is advantageously at least 5% by weight, in particular at least 20% by weight, preferably at least 35% by weight, especially at least 65% by weight. In a further advantageous embodiment, the mineral binder consists to an extent of at least 95% by weight of a hydraulic binder, in particular cement clinker.

According to a preferred embodiment the mineral or cementitious binder of the present invention is a cement of type CEM I, II or III, preferably of type CEM I, as described above. Such cement is referred to as Ordinary Portland Cement (OPC) in the following.

According to another preferred embodiment the mineral or cementitious binder of the present invention is a mixture of OPC and calcium aluminate cement (CAC). The calcium aluminate cement is as described above with a main phase consisting of hydraulic calcium aluminates. The weight ratio of OPC to CAC in such mixtures is >1, preferably >2, more preferably >5. A ratio lower than 1 may lead to problems with curing at temperatures <0° C. and with long term durability. Such mixtures are thus preferably OPC-rich.

According to another preferred embodiment the mineral or cementitious binder additionally comprises up to 35 w %, preferably up to 25 w %, especially up to 15 w %, each based on the total dry weight of the hydraulic binder, of a calcium sulfate. The calcium sulfate may be present in the form of calcium sulfate-hemihydrate (α- and/or β-type), calcium sulfate-dihydrate and/or anhydrite.

However, it can also be advantageous for the binder composition to contain other binders in addition to or instead of a hydraulic binder. These are, in particular, latent hydraulic binders and/or pozzolanic binders. Suitable latent hydraulic and/or pozzolanic binders are, for example, slag, fly ash and/or silica dust. In an advantageous embodiment, the mineral binder comprises 5-95% by weight, in particular 5-65% by weight, especially 15-35% by weight, of latent hydraulic and/or pozzolanic binders.

The term "aggregate" as used in the context of the present invention refers to mineral materials that are non-reactive in the hydration reaction of mineral binders. Aggregates can be any aggregate typically used for cementitious materials such as concrete, mortars, screeds, renders, grouts, coatings, putties or the like. Typical aggregates are for example rock, crushed stone, gravel, slag, sand, recycled concrete, perlite or vermiculite.

The term "particle size" refers for the present purposes to a medium value of the particle size distribution of a solid. This medium value is given as the D50 value of a given particle size distribution and constitutes the value of the particle diameter at 50% in the cumulative distribution. The D50 value is usually interpreted as the particle size where 50% of the particles of a given distribution are larger and 50% are smaller. The D50 is thus a number median. The particle size distribution and thus the particle size as defined above can in particular be determined by laser light scattering, preferably in accordance with the standard ISO 13320: 2009. In particular, a Mastersizer 2000 instrument with a Hydro 2000G dispersing unit and the Mastersizer 2000 software from Malvern Instruments GmbH (Germany) can be used for this purpose.

It was surprisingly found that a combination of the mineral filler F with sodium aluminate SA leads to a higher acceleration of setting and/or curing of mineral binder compositions as compared to the use of either mineral filler F or sodium aluminate SA alone. This is especially true when mineral binder compositions containing this combination of mineral filler F and sodium aluminate SA are cured at temperatures between +10° C. and −15° C., preferably between +8° C. and −10° C. By combining the mineral filler F with sodium aluminate SA and optionally at least one other inorganic compound I a setting of mineral binder compositions, characterized by an increased compressive strength compared to a blank without accelerator, can be achieved within a few hours, preferably within 3-8 h, particularly within 3 h, at temperatures between +10° C. and −15° C., preferably between +8° C. and −10° C.

Another advantage of the combination of mineral filler F with sodium aluminate SA and optionally at least one other inorganic compound I is that other important properties of mineral binder compositions remain unchanged. Especially flow, shrinkage (especially after 24 h), and flexural strength of mineral binder compositions containing compositions of the present invention remain practically unchanged when compared to mineral binder compositions without addition of any substances. A reduced shrinkage is advantageous as it leads to less cracking.

The mineral filler F of the present invention can be an amorphous or crystalline powder. In a preferred embodiment the mineral filler F is a crystalline powder.

The mineral filler F is preferably selected from the group consisting of carbonates and/or hydrogen carbonates of alkali and/or alkali earth metals. Preferably from calcium carbonate, Dolomite and magnesium carbonate. These fillers are available in a range of different particle sizes. It can be preferred to use mixtures of these mineral fillers.

In a preferred embodiment the mineral filler F is calcium carbonate or consists to a major part of calcium carbonate.

Calcium carbonate can be available from natural sources as for example limestone, chalk or marble and may contain other minerals as impurities. Likewise, calcium carbonate can be produced synthetically, for example by precipitation from $CaO$-slurries with $CO_2$ or by spray-drying $CaCO_3$ slurries.

Typically, calcium carbonate powder consists to a minimum of 90 w % of calcium carbonate, based on the total weight of the said powder.

In a preferred embodiment a minimum of 50 w %, preferably a minimum of 70 w %, especially 100 w % of the total weight of the mineral filler F are calcium carbonate.

According to especially preferred embodiments the mineral filler F is not a clay mineral with the exception of kaolinite. Especially, the mineral filler F is essentially free of any of bentonite, montmorillonite, sepiolite, and illite. "Essentially free" means than any of bentonite, montmorillonite, sepiolite, and illite are contained in the mineral filler F in an amount of not more than 10 w %, preferably not more than 3 w %, especially not more than 1 w %, each based on the dry weight of the mineral filler F.

The mineral filler F has a particle size D50 of <10 μm, preferably <5 μm. Especially preferred are particle sizes D50 of 3.5 μm, 1 μm, 0.1 μm, 0.09 μm, 0.08 μm, 0.07 μm, and 0.06 μm.

In a preferred embodiment the mineral filler F comprises less than 20 w %, preferably less than 10 w %, especially less than 5 w %, in particular less than 3 w % of particles with a particle size of more than 25 μm, preferably more than 20 μm. A too high content of large particles of the mineral filler F reduces the effect of the accelerator significantly.

In another preferred embodiment the mineral filler F has a content of at least 10 w %, preferably at least 20 w %, especially at least 30 w % of particles with a particle size of less than 2 μm. It is particularly preferred that the mineral filler F has a content of at least 10 w % of a particle size of less than 1 μm.

A composition of the present invention comprises sodium aluminate SA. Sodium aluminate SA used for the present invention can be a mixed oxide of sodium and aluminum of the chemical formula $Na_xAl_yO_z$ with x, y, z being integers without 0 and the provision that x+3y=2z. Sodium aluminate SA can also be a mixed hydroxide and/or mixed oxide/hydroxide of sodium and aluminum of the chemical formula $Na_nAl_mO_p(OH)_q$ with n, m, p, q being integers including 0 and the provision that n+3m=2p+q. In the special case of p=0 mixed hydroxides of sodium and aluminum result. Especially preferred are $NaAlO_2$ and/or $NaAl(OH)_4$. Mixtures of mixed oxides and/or mixed oxides/hydroxides and/or mixed hydroxides may be used as well. Sodium aluminate SA can be used in powder form or as a solution in water. Typical solutions in water have a solid content of 38% and are for example available from Nordisk Aluminat.

The combination of mineral filler F with sodium aluminate SA shows a surprisingly strong accelerating effect on the setting of mineral binder compositions, preferably cementitious binder compositions. This is especially true at temperatures between +10° C. and −15° C., preferably between +8° C. and −10° C.

In a preferred embodiment, a composition of the present invention, in particular an accelerator for mineral binder compositions, comprises 35-99.7 w %, preferably 60-99 w %, in particular 70-90 w % of the at least one mineral filler F, and 0.3-65 w %, preferably 1-40 w %, more preferably 10-30 w %, in particular 15-30 w % or 20-30 w % of sodium aluminate SA, based on the total weight of said composition.

It is an advantage of a composition of the present invention that also at dosages of sodium aluminate SA of more than 10 w %, preferably more than 15 w %, and as high as 30 w %, each based on the total weight of the composition, the workability of a mineral binder composition comprising such a composition of the present invention is not significantly changed.

It is possible, and in certain embodiments preferred, that a composition of the present invention comprises at least one other inorganic compound I selected from the group of mineral binders as described above and/or from the group of sulfates of alkali or alkaline earth metals. Suitable inorganic compounds I are for example calcium aluminate cements according to EN 14647:2006-01, lithium sulfate, sodium sulfate, potassium sulfate, calcium sulfate, and/or magnesium sulfate. The sulfates of alkali or alkaline earth metals can be used in anhydrous or in hydrated form. Especially preferred are lithium sulfates, in particular lithium sulfate monohydrate.

The at least one inorganic compound I can be contained in compositions of the present invention in an amount of from 0-45 w %, preferably 0.1-15 w %, in particular 1-10 w % based on the total weight of said composition.

It can be advantageous if a composition of the present invention additionally comprises other additives for mineral binder compositions, in particular cementitious binder compositions. Such additives can be for example, plasticizers, superplasticizers, rheology modifiers, retarders, air-entrainers, deaereating agents, corrosion inhibitors, fibers, synthetic organic polymers, expansion producing additives, pigments, waterproofing additives, alkali-aggregate reaction inhibitors, and/or anti-microbial agents.

It can be particularly advantageous to add a superplasticizer to a composition of the present invention. The addition of superplasticizers is particularly preferred if the mineral filler F has a particle size <1 µm. Superplasticizers can be any known to the person skilled in the art. Particular suitable superplasticizers can be poylcarboxylic ethers. Polycarboxylic ethers are comb polymers with a polycarboxylic backbone and polyalkylenoxide side-chains. Such polycarboxylic ethers are for example described in EP 2 468 696 (Sika Technology AG).

Superplasticizers, in particular polycarboxylic ethers, can be added to compositions of the present invention in 0-10 w %, preferably 0.4-8 w %, especially 0.5-7 w %, calculated as dry weight of superplasticizer, based on the total weight of said composition.

Other suitable superplasticizers include lignosulphonates, polynaphthalene sulphonates, polyamine sulphonates, vinyl copolymers and polyethyleneoxide phopsphonates. It can be preferred to add a mixture of different superplasticizers to an accelerator of the present invention.

A preferred composition of the present invention, in particular an accelerator for mineral binder compositions, thus comprises or consists of
 a) 35-99.7 w %, preferably 60-99 w %, in particular 70-90 w % of the at least one mineral filler F with a particle size D50<5 µm, preferably <4 µm, most preferred <3.5 µm,
 b) 0.3-65 w %, preferably 1-40 w %, more preferably 10-30 w %, in particular 15-30 w % or 20-30 w % of sodium aluminate SA,
 c) 0-45 w %, preferably 0.1-15 w %, in particular 1-10 w % of at least one additional inorganic compound I, selected from the group consisting of calcium aluminate cements and/or sulfates of alkali or alkaline earth metals,
 d) 0-10 w %, preferably 0.4-8 w %, especially 0.5-7 w % of a superplasticizer for mineral binder compositions, each calculated as dry weight and each based on the total weight of said composition.

A composition of the present invention, in particular an accelerator for mineral binder compositions, does not contain any alkanolamines, halides, nitrites, nitrates, thiocyanates, glycols, glycerol or α-hydroxycarboxylic acids.

In a preferred embodiment a composition of the present invention, in particular an accelerator for mineral binder compositions, is a powder. This powder can easily be mixed with mineral binders or mineral binder compositions.

Preferably, a composition of the present invention, in particular an accelerator for mineral binder compositions, is obtained by mixing of the ingredients. In particular, a possibly present liquid component is adsorbed on the at least one mineral filler F. The at least one mineral filler F can be mixed with other powder components of the composition of the present invention prior or after such adsorption of liquids. Suitable methods for the mixing of powders and/or for the mixing of powders with liquids are known to the person skilled in the art. Optionally, water or other solvents can be removed from the composition of the present invention. In especially preferred embodiments of the present invention, the water content of compositions of the present invention is <5 w % based on the weight of the total composition. A low water content can facilitate further processing steps as described in the following.

In a further aspect, the present invention relates to a further processing step for the production of a composition, preferably an accelerator, according to the present invention. Preferred further processing steps are dedicated to simplify storage, transportation, metering, and/or dosage of a composition of the present invention. A process for the production of a composition of the present invention thus comprises a further processing steps to prevent dust formation during storage, transportation, metering, and/or dosage of the compositions of the present invention.

One suitable further processing step can be for example the preparation of an aqueous slurry of the composition of the present invention. Such a slurry can easily be dosed together with the mixing water, or shortly before or after addition of the mixing water, to a mineral binder composition.

Another suitable further processing step can be for example granulation of a composition of the present invention. Granulation can be done on ploughshare mixers, ring layer mixers or mixing granulators in a batch process or in a continuous production. It can be a wet or a dry granulation process. It can be preferred to include a drying step into the granulation process. It is possible, and in the context of the present invention also preferred, to add processing aids during granulation. Preferably such processing aids are fully water-soluble at temperatures <10° C. Granules can easily be dosed to a dry mix of mineral binder compositions or together with the mixing water, or shortly after the mixing water.

Yet another suitable processing step can be for example the encapsulation of a composition of the present invention. Suitable capsules in the context of the present invention include materials that easily break by the mechanical forces during the preparation and mixing of mineral binder compositions and/or that dissolve in the mixing water, preferably at temperatures <10° C., especially <5° C. Suitable capsules are for example described in US2001/0043999 (Warner-Lambert Co).

Another suitable further processing step can be for example coating of a composition according to the present invention. Processes for coating of powders are known to the person skilled in the art. Suitable processes may be coating in a fluidized bed, spray drying or precipitation coating. Suitable materials for coating a composition of the present invention are water soluble, preferably soluble in water at temperatures <10° C., more preferably soluble in water at temperatures <5° C.

It is for example yet another suitable processing step to package the compositions of the present invention into a pouch, preferably a water soluble pouch, most preferred into a pouch that dissolves in water at temperatures <10° C., preferably <5° C. The thickness of the water-soluble pouch preferably is between 0.001-0.1 mm, more preferred from 0.003-0.08 mm, especially from 0.01-0.06 mm. The use of such pouches is for example described in U.S. Pat. No. 5,120,367 (Fritz Chemical Company).

Preferred materials used as processing aids in granulation, as encapsulants, as coatings, or as packagings are polyvinylacohols (PVA), which can be fully or partially acetylated, polyvinylpyrrolidones, polyethyleneoxides, gelatin and/or celluloses. The preferred materials may contain additional substances such as stabilizers, rheology controls, pigments, biocides and/or processing aids. It is however preferred, that the materials are completely water-soluble at temperatures <10° C., preferably <5° C.

In a preferred embodiment of the present invention, PVA-based materials are used in any of the above-described processing steps of granulation, encapsulation, coating or packaging of the accelerators of the present invention. PVA-based means, for the context of the present invention, that at least 90 w %, preferably at least 95 w %, more preferred at least 98 w % of a given material consist of PVA. PVA-based films, capsules, coatings or pouches can have excellent cold temperature impact strength, good compatibility with chemicals, reduced water vapor permeability, and unique solubility characteristics in water, especially at low temperatures such as temperatures <10° C., preferably <5° C.

Especially suitable pouches consist of PVA and are commercially available for example from the company Arrow Greentech Ltd under the trade name Watersol.

According to a preferred embodiment of the present invention a water-soluble shell is added to a composition of the present invention, in particular an accelerator for mineral binders. In particular this shell can be a PVA-based capsule or pouch.

An advantage of providing the compositions of the present invention in form of a slurry, as granules, coated, encapsulated and/or packaged are the easy metering and dosage of the said compositions and thereby a better control of the acceleration of mineral binder compositions containing said compositions. Another advantage is the avoidance of dust formation during handling and thereby preventing inhalation, and avoidance of the contact of said compositions with the skin and/or mucous membranes and thereby preventing irritation of the skin and/or mucous membranes.

It is an additional aspect of the present invention to provide an article consisting of
1) at least one container, preferably a capsule or a pouch, that readily breaks or dissolves when mixed with water and/or other ingredients of mineral binder compositions
2) an accelerator for mineral binder compositions containing or consisting of
   a) 35-99.7 w % of at least one mineral filler F with a particle size D50<5 μm, preferably <4 μm, most preferred <3.5 μm,
   b) 0.3-65 w % of a sodium aluminate SA,
   c) optionally 0-45 w % of at least one other inorganic compound I selected from the group consisting of calcium aluminate cements and/or sulfates of alkali or alkaline earth metals, and
   d) optionally further additives for mineral binder compositions, in particular cementitious binder compositions,
characterized in that the whole mass of the accelerator is contained within the at least one container.

It should be understood that for the purpose of the present invention the whole mass of the accelerator can be contained within one container as described above. It is, however, also possible that the whole mass of the accelerator is contained in a multitude of containers, provided that no accelerator is left outside such containers.

It is preferred in the context of the present invention that the thickness of the container of an article as described above preferably is between 0.001-0.1 mm, more preferred from 0.003-0.08 mm, especially from 0.01-0.06 mm. It is further preferred in the context of the present invention that the container of an article as described above consists of a material based on polyvinylacohols (PVA), which can be fully or partially acetylated, polyvinylpyrrolidones, polyethyleneoxides, gelatin and/or celluloses, preferably of a PVA-based material.

In an additional aspect, the present invention relates to the use of a composition according to the present invention for acceleration of the setting and/or hardening of a mineral binder or mineral binder composition in particular a cementitious binder composition, more particularly of a mortar or concrete composition. Preferably, the mineral binder is a cementitious binder as described above.

A composition according to the present invention leads to an increase in compressive strength when used to accelerate a mineral binder or mineral binder composition. The compressive strength is particularly increased within 3-24 h, preferably 3-8 h, after mixing with water and compared to a blank without added accelerator.

In a preferred embodiment of the present invention, a composition according to the present invention is used to accelerate the setting and/or curing of a mineral binder or mineral binder composition at temperatures between +10° C. and −15° C., preferably between +8° C. and −10° C. In another preferred embodiment of the present invention, the mixing water used for mixing the mineral binder composition containing a composition according to the present invention is cold water, preferably of a temperature of <10° C.

It is yet another aspect of the present invention to provide a composition according to the present invention in a way to prevent dust formation. It is particularly preferred that a composition according to the present invention is provided in form of an aqueous slurry, as granules, coated, encapsulated and/or packaged in a pouch. Preferably, materials used for granulation, coating, encapsulation and/or packaging of the accelerator of the present invention are water-soluble, preferably at low temperatures such as <10° C., preferably <5° C. The order of addition of an accelerator in any of these forms, the mineral binder or mineral binder composition, optionally aggregates, optionally further additives, and mixing water to form a mineral binder composition can be in any given order. The accelerator can, for example, be added to the dry mix followed by the mixing water. It can, however, also be pre-mixed with the mixing water and then added to the dry mix.

The present invention thus also relates to a method for accelerating a mineral binder compositions by the use of a composition of the present invention comprising the steps of
   a) providing the composition of the present invention in the form of a slurry, granulated, coated, encapsulated or packaged in a water-soluble pouch,
   b) providing a mineral binder or mineral binder composition,
   c) providing water,
   d) mixing the ingredients a)-c) in any given order,
   e) placing the mixed composition.

According to a preferred embodiment, any of steps a) to e) are executed at temperatures between +10° C. and −15° C., preferably between +8° C. and −10° C.

As additional aspect, the present invention relates to mineral binders or mineral binder compositions containing a composition according to the present invention. The mineral binder here is as defined above. The mineral binder composition may take the form, for example, of a dry composition or of a fluid or stiffened binder composition mixed up with mixing water. The mineral binder composition may also take the form of a fully cured mineral binder composition—for example, a shaped body.

The mineral binders or mineral binder compositions preferably comprise a composition according to the present invention in an amount of 0.1-5 w %, preferably 0.2-2 w %, especially 0.3-1 w % based on the total weight of the mineral binder.

A mineral binder composition, in particular a cementitious binder composition, of the present invention thus comprises at least one mineral binder, aggregate, optionally water, and, in each case based on the mineral binder content,
   a) 0.05-5 w %, preferably 0.06-5 w %, more preferably 0.07-4.5 w %, in particular 0.1-1 w % of the at least one mineral filler F, b) 0.0003-2.5 w %, preferably 0.001-2 w %, more preferably 0.01-1.5 w %, in particular 0.01-0.7 w % of sodium aluminate SA, c) 0-1 w %, preferably 0.0001-0.75 w %, in particular 0.001-0.5 w % of at least one additional inorganic compound I, d) 0-0.5 w %, preferably 0.0004-0.4 w %, in particular 0.0005-0.35 w % of additional additives, preferably of a superplasticizer.

The present invention also relates to a process for producing and/or placing a mineral binder composition comprising at least one mineral binder, where a composition according to the present invention is added. Addition of a composition according to the present invention can be to the dry mix or together with the mixing water, or shortly after the mixing water. This leads to a particularly strong acceleration of the setting of the mineral binder composition, especially after 3-8 hours, and at the same time the workability of the mineral binder composition is maintained within a range which is relevant for practice. In a preferred embodiment of the present invention the production and/or placing of a mineral binder composition containing a composition according to the present invention is done at temperatures between +10° C. and −15° C., preferably between +8° C. and −10° C. The present invention thus relates to a process for producing and/or placing a mineral binder composition, wherein a composition, in particular an accelerator for mineral binder compositions, as described above is mixed with at least one constituent of a binder composition, in particular a mineral binder, aggregates and/or the mixing water.

An additional aspect of the present invention pertains to a shaped body which is obtainable by curing a mineral binder composition as described above, comprising at least one mineral binder and a composition according to the present invention, after addition of water. The shaped body thus produced may have virtually any desired form and may for example be part of an edifice, such as of a building, of a masonry construction or of a bridge, for example.

The following working examples illustrate the invention. The examples are not intended to limit the scope of the invention in any way.

WORKING EXAMPLES

Compressive strength was determined according to standard ASTM C-109 using 4×4×16 cm prisms. The prisms were hardened under conditions as indicated in the tables below. Measurement was done after the time given in table 1 starting from the addition of mixing water.

The flexural strength was measured according to standard ASTM C-348 using 4×4×16 cm prisms. The prisms were hardened under conditions as indicated in the tables below. Measurement was done after the time given in table 1 starting from the addition of mixing water.

Composition of Accelerators

A-1: 70 w % calcium carbonate with a particle size D50 of 3.5 μm (Omyacarb 3 from Omya), 20 w % of anhydrous sodium aluminate (available from Sigma-Aldrich and used as supplied), and 10 w % of lithium sulfate monohydrate (available from Sigma-Aldrich and used as supplied). All w % are relative to the total dry weight of the accelerator.

A-2: 35 w % calcium carbonate with a particle size D50 of 3.5 μm (Omyacarb 3 from Omya), 35 w % of a calcium aluminate cement, 20 w % of anhydrous sodium aluminate (available from Sigma-Aldrich and used as supplied), and 10 w % of lithium sulfate monohydrate (available from Sigma-Aldrich and used as supplied). All w % are relative to the total dry weight of the accelerator.

A-3: 75 w % calcium carbonate with a particle size D50 of 3.5 μm (Omyacarb 3 from Omya) and 25 w % of anhydrous sodium aluminate (available from Sigma-Aldrich and used as supplied). All w % are relative to the total dry weight of the accelerator.

Preparation of Mortars

The ingredients for the accelerator and the mixing water were weighed into a Hobart mixer in a dosage and at a temperature as given in below table 1. Mixing was done for 1 minute at the temperature indicated in below table 1. Then dry mortar of type M1 (SikaQuick 2500 available from Sika Corporation, USA) or type M2 (SikaQuick VOH available from Sika Corporation, USA) was added in a dosage as indicated in below table 1 and mixing was continued for 3 min at the temperature indicated in below table 1. Placing, curing, and measurements were done at temperatures as given in below table 1.

Examples C-1, C-2, C-3, C-4, C-5, and C-6 of the following table 1 constitute comparative examples and are not according to the present invention. Examples E-1, E-2, E-3, E-4, E-5, E-6, E-7, E-8, E-9, and E-10 of the following table 1 constitute examples according to the present invention.

TABLE 1

Mortar mixes and conditions

| Example | Dry mortar mix type | Dry mortar mix dosage | Accelerator type and dosage | Mixing water dosage | T (mixing water) | T (mixing, placing, curing) |
|---|---|---|---|---|---|---|
| C-1 | M1 | 100 g | None | 11.5 g | 23° C. | 23° C. |
| E-1 | M1 | 100 g | 0.5 g A-1 | 11.5 g | 23° C. | −6° C. |
| E-2 | M1 | 100 g | 1 g A-1 | 11.5 g | 23° C. | −6° C. |
| C-2 | M1 | 100 g | None | 11.5 g | 23° C. | −6° C. |
| C-3 | M1 | 100 g | None | 11.5 g | 5° C. | 5° C. |
| E-3 | M1 | 100 g | 0.5 g A-1 | 11.5 g | 5° C. | 5° C. |
| E-4 | M1 | 100 g | 0.5 g A-2 | 11.5 g | 5° C. | 5° C. |
| E-5 | M1 | 100 g | 0.5 g A-3 | 11.5 g | 5° C. | 5° C. |
| C-4 | M2 | 100 g | None | 15.4 g | 23° C. | 23° C. |
| E-6 | M2 | 100 g | 0.5 g A-1 | 15.4 g | 23° C. | −6° C. |
| E-7 | M2 | 100 g | 1 g A-1 | 15.4 g | 23° C. | −6° C. |
| C-5 | M2 | 100 g | None | 15.4 g | 23° C. | −6° C. |
| C-6 | M2 | 100 g | None | 15.4 g | 5° C. | 5° C. |
| E-8 | M2 | 100 g | 0.5 g A-1 | 15.4 g | 5° C. | 5° C. |
| E-9 | M2 | 100 g | 0.5 g A-2 | 15.4 g | 5° C. | 5° C. |
| E-10 | M2 | 100 g | 0.5 g A-3 | 15.4 g | 5° C. | 5° C. |

T: temperature

TABLE 2

Results with mortar M1

| Example | Compressive strength [psi] | | | | | Flexural strength [psi] | |
|---|---|---|---|---|---|---|---|
| | 2 h | 3 h | 24 h | 7 d | 28 d | 24 h | 7 d |
| C-1 | 4000 | n.m. | 5700 | 7500 | 8500 | 800 | 1000 |
| E-1 | n.m. | 2150 | 5800 | 7500 | 8900 | 1380 | 2050 |
| E-2 | n.m. | 2365 | 6380 | n.m. | n.m. | n.m. | n.m. |
| C-2 | n.m. | 1150 | 5500 | 7000 | 8000 | 1368 | 1470 |
| C-3 | 1730 | 3455 | 6573 | 8000 | 9000 | n.m. | n.m. |
| E-3 | 3803 | 4691 | 7293 | 8500 | 9200 | n.m. | n.m. |
| E-4 | 3331 | 4742 | 6899 | 7900 | 8800 | n.m. | n.m. |
| E-5 | 2471 | 4090 | 6800 | 8000 | 9000 | n.m. | n.m. | n.m.: not measured

Comparing E-1 with C-2 it is obvious that a higher compressive strength is achieved within the first hours after mixing. E-2 shows that the effect is further increased with a higher dosage of the accelerator. In comparison with C-1, E-1 shows a regular further hardening (after 24 h after mixing) and regular final compressive strength within 28d after mixing while C-2 has not reached the final compressive strength even after 28d.

The comparison of E-3, E-4, and E-5 with C-3 also shows a higher compressive strength at the early age. Again, this is followed by a hardening after 24 h after mixing and final compressive strength similar to C-3 (without added accelerator).

This is as wished since high early compressive strength allows for more rapid continuation of work while final strength is not compromised.

Comparison of E-1 with C-2 also shows that the flexural strength is not compromised by the addition of accelerator.

TABLE 3

Results with mortar M2

| Example | Compressive strength [psi] | | | | | Flexural strength [psi] | |
|---|---|---|---|---|---|---|---|
| | 3 h | 5 h | 24 h | 7 d | 28 d | 24 h | 7 d |
| C-4 | 2000 | n.m. | 3000 | 4500 | 5500 | 400 | 600 |
| E-6 | 1150 | 1550 | 2650 | 4550 | 5000 | 850 | 1170 |
| E-7 | 1265 | 1700 | 2915 | 5000 | 5500 | n.m. | n.m. |
| C-5 | 0 | 1200 | 2350 | 3150 | 4000 | 860 | 1070 |
| C-6 | 820 | 1618 | 2822 | 3300 | 2900 | n.m. | n.m. |
| E-8 | 1354 | 2125 | 3348 | 4000 | 4000 | n.m. | n.m. |
| E-9 | 1528 | 2348 | 2927 | 3800 | 3800 | n.m. | n.m. |
| E-10 | 1146 | 1769 | 2904 | 3300 | 3200 | n.m. | n.m. | n.m.: not measured

Comparing E-6 with C-5 it is obvious that a higher compressive strength is achieved within the first hours after mixing. In fact, C-5 does not set at all within the first 3 hours after mixing. E-7 shows that the effect is further increased with a higher dosage of the accelerator. In comparison with C-4, E-6 shows a regular further hardening (after 24 h after mixing) and final compressive strength within 28d after mixing while C-5 has a much lower compressive strength even after 28d.

The comparison of E-8, E-9, and E-10 with C-6 also shows a higher compressive strength at the early age. E-8, E-9, and E-10 also show a much better hardening after 24 h when compared to the untreated comparison C-6.

Comparison of E-6 with C-5 also shows that the flexural strength is not compromised by the addition of accelerator.

The invention claimed is:

1. A composition comprising:
   a) 35-99.7 w % of at least one mineral filler F with a particle size D50 <5μm;
   b) 0.3-65 w % of a sodium aluminate SA;
   c) 0.1-45 w % of at least one other inorganic compound I selected from the group consisting of calcium aluminate cements and lithium sulfate; and
   d) optionally further additives for mineral binder compositions.

2. A composition according to claim 1, wherein the mineral filler F is selected from the group consisting of carbonates, hydrogencarbonates of alkali, and alkaline earth metals.

3. A composition according to claim 1, wherein the sodium aluminate SA is $NaAlO_2$.

4. A composition according to claim 1, wherein the composition further comprises a superplasticizer, in an amount of 0.1-10 w %, related to the total weight of the composition.

5. A process for the production of a composition according to claim 1, the process comprising a step of mixing of the ingredients and a step of reducing at least one of dust formation during storage, transportation, metering, and dosage of the composition.

6. A process according to claim 5, wherein the composition is packaged into a water soluble pouch.

7. An article consisting of:
   1) at least one container that readily breaks or dissolves when mixed with water and/or other ingredients of mineral binder compositions; and
   2) an accelerator for mineral binder compositions according to claim 1,
   wherein the whole mass of accelerator is contained within the at least one container.

8. A method for accelerating at least one of the setting and the curing of a mineral binder or of a mineral binder composition, the method comprising adding the composition of claim 1 to a mineral binder or a mineral binder composition.

9. The method according to claim 8, wherein the mineral binder comprises a mixture of OPC and CAC in a weight ratio of OPC to CAC of >1.

10. The method according to claim 8, wherein the at least one of the setting and the curing is accelerated at temperatures between +10° C. and 15° C.

11. The method according to claim 8, wherein the mixing water for a mineral binder composition has a temperature of <10° C.

12. A method for accelerating a mineral binder compositions comprising the steps of:
   a) providing the composition according to claim 1 in the form of a slurry, granulated, coated, encapsulated or packaged in a water-soluble pouch;
   b) providing a mineral binder or mineral binder composition;
   c) providing water;
   d) mixing the ingredients a) —c) in any given order; and
   e) placing the mixed composition.

13. A method according to claim 12, wherein any of steps a) to e) are executed at temperatures between +10° C. and 15° C.

14. A mineral binder composition containing at least one mineral binder, aggregate, optionally water, and, in each case based on the mineral binder content,
   a) 0.05-5 w % of at least one mineral filler F,
   b) 0.0003-2.5 w % of sodium aluminate SA,
   c) 0.0001-1 w % of at least one additional inorganic compound I, and
   d) 0-0.5 w % of additional additives.

15. A process for at least of one of producing and placing a mineral binder composition, as claimed in claim 14, the process comprising mixing the mineral binder composition with a composition comprising:
   a) 35-99.7 w % of at least one mineral filler F with a particle size D50<5 μm,
   b) 0.3-65 w % of a sodium aluminate SA,
   c) 0-45 w % of at least one other inorganic compound I selected from the group consisting of calcium aluminate cements and sulfates of alkali or alkaline earth metals, and
   d) optionally further additives for mineral binder compositions.

16. A shaped body obtained by curing a mineral binder composition as claimed in claim 14 after the addition of water.

* * * * *